United States Patent
Rahman et al.

(10) Patent No.: US 7,114,080 B2
(45) Date of Patent: Sep. 26, 2006

(54) ARCHITECTURE FOR SECURE REMOTE ACCESS AND TRANSMISSION USING A GENERALIZED PASSWORD SCHEME WITH BIOMETRIC FEATURES

(75) Inventors: Mahfuzur Rahman, South Brunswick, NJ (US); Prabir Bhattacharya, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 820 days.

(21) Appl. No.: 09/819,509

(22) Filed: Mar. 28, 2001

(65) Prior Publication Data

US 2002/0144128 A1 Oct. 3, 2002

Related U.S. Application Data

(60) Provisional application No. 60/255,640, filed on Dec. 14, 2000.

(51) Int. Cl.
*H04K 1/00* (2006.01)
*G06K 9/00* (2006.01)
*G06F 7/04* (2006.01)
*H04L 9/32* (2006.01)

(52) U.S. Cl. .................. 713/186; 726/5; 382/115

(58) Field of Classification Search ........... 713/186, 713/202, 182, 183, 184, 185, 168; 382/155, 382/115; 380/30; 709/225, 229, 250; 726/5
See application file for complete search history.

(56) References Cited

U.S. PATENT DOCUMENTS

| 6,119,096 A | | 9/2000 | Mann et al. | |
|---|---|---|---|---|
| 6,263,446 B1 | * | 7/2001 | Kausik et al. | 713/201 |
| 6,356,941 B1 | * | 3/2002 | Cohen | 713/201 |
| 6,618,806 B1 | * | 9/2003 | Brown et al. | 713/186 |
| 6,732,278 B1 | * | 5/2004 | Baird et al. | 713/182 |
| 2001/0055388 A1 | * | 12/2001 | Kaliski | 380/30 |
| 2002/0124176 A1 | * | 9/2002 | Epstein | 713/186 |
| 2003/0225693 A1 | * | 12/2003 | Ballard et al. | 705/42 |
| 2004/0230807 A1 | * | 11/2004 | Baird et al. | 713/182 |

FOREIGN PATENT DOCUMENTS

WO WO 3063411 A1 * 7/2003

OTHER PUBLICATIONS

Leslie Lamport, "Password Authentication with Insecure Communication", Communications of ACM, vol. 24, No. 11, Nov. 1981, pp. 770-772.*

(Continued)

*Primary Examiner*—Matthew Smithers
*Assistant Examiner*—Courtney Fields
(74) *Attorney, Agent, or Firm*—RatnerPrestia

(57) ABSTRACT

A remote computer access facility uses two dedicated computers outside the firewall. To ensure security the system makes use of biometrics features and a one-time password mechanism on top of secure socket layer (SSL) to authenticate a user. The system also provides three layers of security levels for transmission. The first layer establishes an SSL connection, the second layer periodically asks for a one-time password (OTP), and the third layer uses any kind of conventional encryption. The combination of the biometric, OTP and encryption key forms a strong password. The system also uses a mechanism for secure file accesses within the organization based on the security privileges assigned to various users. Based on the user's access privileges, the server side software module sends the requested file in an encrypted form along with the key to decrypt that file—this key is encrypted by the user's strong password.

22 Claims, 2 Drawing Sheets

OTHER PUBLICATIONS

Rahman, Mahfuzur and Bhattacharya, Prabir, "Secure Network Communication Using Biometrics", Multimedia and Expo, 2001, ICME 2001, IEEE International Conference, Aug. 22-25, 2001, pp. 269-272.*

N. Haller, "The S/Key One-Time Password System", http://developer.netscape.com/docs/manuals/security/Sslin/contents.htm, Feb. 1995.

C. Gilmore et al., "Secure Remote Access to an Internal Web Server", AT&T Labs—Research, Florham, Park, NJ, USA.

"Introduction to SSL", http://developer.netscape.com/docs/manuals/security/sslin/contents.htm.

"ID in the Blink of an Eye", http://www.washtech.com/cgi-bin. . ./WTW.PRINT.STORY?client=washtech-tTest&storyid=819.

"Introduction to Public-Key Cryptography", http://developer.netscape.com/docs/manuals/security/pkin/Contents.htm.

* cited by examiner

ARCHITECTURE FOR SECURE REMOTE ACCESS AND TRANSMISSION USING A GENERALIZED PASSWORD SCHEME WITH BIOMETRIC FEATURES

CROSS-REFERENCE TO RELATED APPLICATIONS

This application claims the benefit of U.S. Provisional Application No. 60/255,640, filed Dec. 14, 2000, the contents of which are incorporated herein by reference.

BACKGROUND OF THE INVENTION

The present invention concerns a computer architecture that allows secure access to a server behind a firewall and in particular to a system that employs multiple computers outside of the firewall and a password scheme that includes a one-time password and has biometric features.

As computer hacking is quite common nowadays, it is very important to control access to a private network of computers (for example, the desktop computers in a company network)—to order to protect against the loss of sensitive data to external hackers. A firewall is a component or components designed to restrict access to a private network from the Internet.

There has been recently considerable interest to use biometrics features for authentication of computer users who communicate through a global information network such as the Internet as well as local area networks (see e.g., R. Jain et al. "Biometrics: Personal Identification in Networked Society" Kluwer Publishers, Boston, Mass., 1999). The biometrics features of an individual are unique and provide a very convenient method for personal identification. The term biometrics generally means any human characteristic that has the following desirable properties:

universality—every person should have the characteristic
uniqueness—no two persons should possess the same characteristic
permanence—the characteristic should not change with time
measurability—it should be possible to measure the characteristic in a quantitative manner.

There are many practical issues involved in developing an authentication scheme using biometrics. Some good pattern recognition algorithms should be developed and used to recognize the biometrics to a very high degree of accuracy (even under "noisy" conditions) and to within a reasonable computer processing time. Also, the biometrics should not be prone to easy tampering by hackers. There are also privacy and network security issues that are involved for developing an on-line biometrics-based authentication system.

The features that have been commonly used in developing automatic authentication systems are fingerprints, voice, iris, retina patterns, and face. Also, there are some other more unconventional biometrics such as body odors, gait, ear shape, etc. that have been used for developing methods for personal identification. There are several currently available systems for on-line fingerprint verification and on-line signature verification. A secure method for accessing files using fingerprints has been is described in copending U.S. patent application Ser. No. 09/662,298 entitled SECURE SYSTEM AND METHOD FOR ACCESSING FILES IN COMPUTERS USING FINGERPRINTS, which is incorporated herein by reference.

The use of fingerprints is the oldest biometrics-based method for identification purposes, predating the advent of computer technology. The technique has been widely used at least since 6000 B.C. It has been in use by police forces for centuries for the identification of criminals. Consequently, in some cultures there may be still some stigma attached to the recording of fingerprints of people who are not accused of any crime. Nonetheless, fingerprints are widely used. For example, the U.S. Immigration and Naturalization Services (INS) routinely collects the fingerprints of all people applying for Permanent Residence ("Green Card") and keeps an extensive database of these fingerprints. With the introduction of more and more computer hardware, the identification method using fingerprints has become progressively more and more advanced and easier to use in an on-line environment. More recent biometric-based methods of identification, such as iris pattern recognition, retinal pattern recognition, voice recognition, etc., have similarly benefited from the advancing use of computers.

The idea of one time password mechanism is described in an article by L. Lamport entitled "Password Authentication with Insecure Communications," *Communications of the ACM*, vol. 24, No. 11, pp 770–772, 1981. It is designed to counter an attack based on eavesdropping of network connections to get login id and password. In order to use one time password mechanism the user first chooses a password and stores it in the authentication server. The server chooses a number n (something reasonably large) and recursively hashes the password n times (i.e. computes $hash^n(password)$ for some hash function) and stores the result in a database on the server along with the user id and the number n. The number n represents the number of one time password the user can use i.e., the number of log-in sessions the user can have with this password mechanism scheme. With each use the hash function is applied one less time, creating a respectively different password. If the user exceeds the n number of log-in sessions then, he or she needs to initialize again the one time password mechanism with the server.

One version of the one-time password scheme is called S/KEY and is described in RFC 1760 by N. Haller entitled "The S/Key One-Time Password System," 1995. Briefly, a one-time password mechanism operates as shown in FIG. 1.

The one-time password process begins with a table in the remote machine (authentication server) 102 that contains the log-in identifier, the number n and the value $hash^n(password)$. Next, a user logs into his or her local computer 100 using the password and log-in identifier and requests access to the remote server 102. The user's computer then sends an authentication request to the remote machine 102. After receiving the authentication request, the remote server 102 sends the value n with a request for the user's computer 100 to calculate the value $hash^{n-1}(password)$. The user's computer 100 calculates this value and sends it back to the remote server 102. When the remote server 102 receives $hash^{n-1}(password)$ it assigns the value to a local variable y and then calculates hash(y). This value should be the same as $hash^n(password)$. If hash(y) matches the stored value, $hash^n(password)$, then the server grants the user access, decrements n by 1 and stores the value $hash^{n-1}(password)$ in its database.

SUMMARY OF THE INVENTION

The present invention implements a mechanism that uses biometric features combined with a one-time password to generate cryptographic keys that are used for secure communication, authentication of remote users and accessing of secured file based on a hierarchical scheme of access privileges.

The present invention is embodied in a computer system that concatenates biometric data with a one-time password to form a strong password that is used to access secure data.

According to one aspect of the invention, the strong password is encrypted using an encryption key before it is presented to gain access to the data.

According to another aspect of the invention, the invention is embodied in a computer system that includes a secure server that is protected by a firewall; a proxy server that is not protected by the firewall and includes a secure connection to the secure server; and an access computer that is connected to the proxy server and that is coupled to receive requests for information on the secure server.

DETAILED DESCRIPTION OF THE INVENTION

Figure 1:
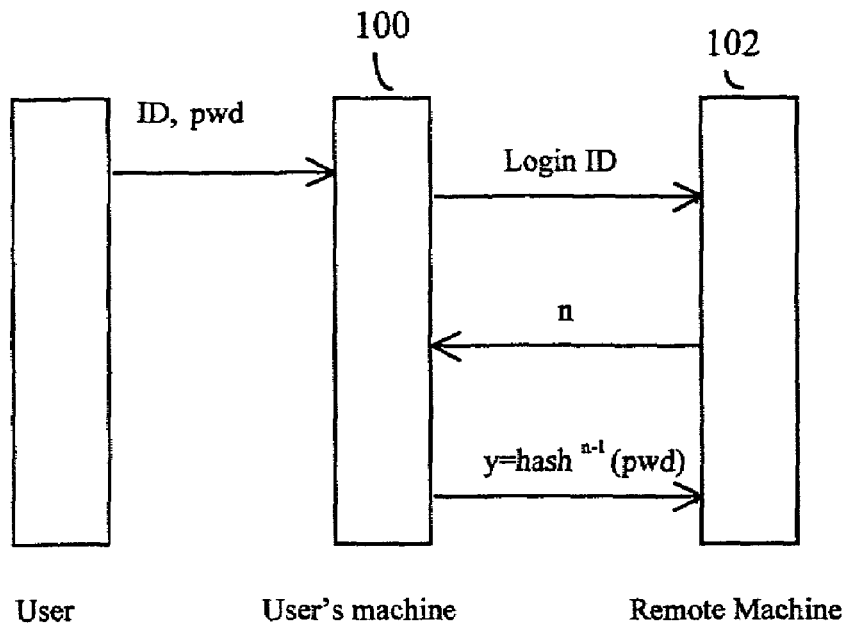
FIG. 1 is a block diagram which illustrates a one-time password mechanism.
Figure 2:
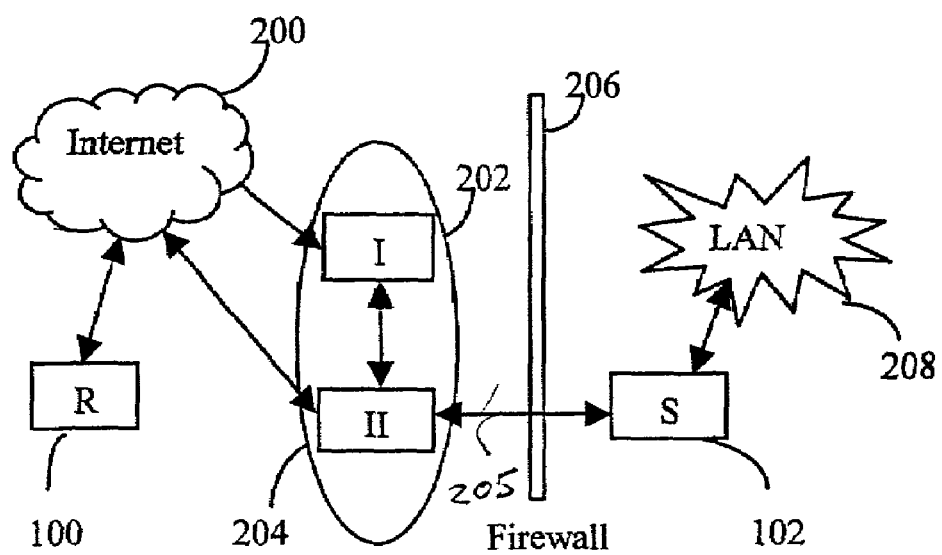
FIG. 2 is a block diagram which illustrates operation of an exemplary embodiment of the present invention.

The proposed architecture for the remote machine access authentication scheme has at least two dedicated computers outside of the firewall to provide secure log-in. As shown in FIG. 2, a remote computer 100 communicates with the first dedicated computer 202 outside the firewall 206 before establishing any communication with any computer 208 inside the firewall. This first computer 202 works with an internal server 102, through a second computer outside the firewall, to authenticate the user's access privileges. A second computer 204 outside the firewall has a secure connection 205 with the server 102 inside the firewall 206 and acts as a proxy for the first computer 202. In the exemplary embodiment of the invention, the connection between the remote machine 100 and the first dedicated machine 202 outside the firewall 206, the connection between the two dedicated machines 202 and 204 outside the firewall 206, and the connection between the second dedicated computer 204 and the server 102 inside the firewall all use Secure Socket Layer (SSL) connections. Secure Socket Layer connections are described in a document entitled "Introduction to SSL" http://developer.netscape.com/docs/manuals/security/sslin/contents.htm which is incorporated by reference herein for its teachings on SSL connections. Although the exemplary embodiment shows two computers 202 and 204 outside of the firewall 206, it is contemplated that more computers may be used to further impede access to the server by an unauthorized user.

The process begins when the remote computer 100 and the first dedicated computer 202 establish an SSL connection. The dedicated computer 202 then sends a request to the remote computer 100 for the user's strong password information (by a "strong password" we mean the user's password derived from a one-time-password (OTP) and biometrics features). One way that this may be done is by setting up a web page that requests the user's strong password. The OTP scheme allows the system to use a different password each time providing unpredictability and consequent security against any compromise by a hacker. In order to use this system, the user initializes the number of OTP's and also provides a secure pass-phrase into the server 102 inside the firewall. This is typically a server that already exists within the user's organization. The second dedicated computer 204 acts as a proxy for the first dedicated computer 202 and does not allow any other connection from any other computers. The second dedicated computer 204 is connected to the server inside the firewall using an SSL connection.

In addition, the user has previously trained the server to recognize the biometric password. As described in the above-referenced patent application, this password is biometric data that the server has been trained to recognize as identifying the user. It may represent a fingerprint, a signature, a spoken phrase or any other feature that can be used to uniquely identify the user. Typically the server is trained to recognize the biometric data by analyzing many different samples of a particular biometric feature. For example, a user may provide multiple instances (i.e. an integer N) of his or her right thumb print, signature or other biometric feature where N is large enough to ensure that a correct decision may be made in response to later presented biometric data at least a given percentage of the time (e.g. 95 percent). The training in the server may, for example, use a neural network or may use more conventional statistical processing techniques such as the recognition and clustering of features and the generation of multivariate Gaussian frequency distributions for the clustered features extracted from the multiple instances of the biometric.

Using the trained model, a particular biometric data set is analyzed to determine the probability that it matches. If this probability is greater than a predetermined threshold value, the biometric password is accepted as identifying the individual The user then generates the strong password and sends it to the first dedicated computer 202. The strong password may be generated, for example, by concatenating the biometric password with the OTP and, optionally, with a symmetric key that may be used to decrypt the transferred message data and encrypting the combined password using any one of a number of conventional encryption algorithms such as RSA or Elliptic Curve Cryptography. This combined password has the advantage that the same password is never transmitted twice because the OTP changes with each transmission and the biometric data typically varies from transmission to transmission. This variability may be used as a further verification, whereby the server rejects a received biometric password if the biometric data set is identical to a previously received data set.

Although the exemplary embodiment of the invention concatenates the biometric data with the OTP to form the strong password, it is contemplated that the biometric data and OTP may be combined in other ways. For example, the OTP and biometric data may be combined using an arithmetic operation or combination of arithmetic operations and the result used as the strong password. Because the OTP may be generated independently and stored both at the server and at the user's computer, the biometric data may be recovered from any of these combinations.

After verifying the strong password, the second dedicated computer 204 establishes a direct SSL connection with the remote computer 100 through the Internet 200 and acts as a proxy for the remote computer 100 to the server 102 inside the firewall 206. (A less secure way would to establish a direct SSL connection between the remote computer and the server—this option could be used at the discretion of the organization.) This scheme differs from the AT&T scheme called ABSENT in the following way: the system according to the subject invention has at least two dedicated computers outside the firewall 206, and the remote computer 100 initiates communication only with the first computer 202 which does not have any direct connections with any computers inside the firewall. Thus the arrangement according to the present invention provides less vulnerability and a more secure communication link as compared to the ABSENT system. In addition, the ABSENT system does not use a password that is formed by concatenating an OTP with a biometric password.

The present invention uses up to three layers of protection depending on the sensitivity of the protection needed. In the exemplary embodiment of the invention, these layers of protection are applied in the following order:

i. At the top layer, an SSL connection is established between the remote computer and a computer outside the firewall that acts as a proxy for the server.

ii. In the second layer, a OTP is used that that changes periodically as a means to authenticate the user's continued presence. For example, every 15 minutes the dedicated machine inside the Firewall requests an OTP password to check the user's continued presence and disrupts the communication if, at any time, the authentication is not valid. The time frame for periodic authentication may be changed at the wish of the organization depending on its sensitivity level.

iii. In the third layer, the actual message data is further encrypted using any conventional encryption scheme (such as DES, ECC) between the remote computer and the computer to be accessed inside the organization. The key for the encryption is derived using the OTP and biometrics features (such as fingerprints) as described above. As the OTP changes periodically, it provides an extra level of security.

Figure 3:
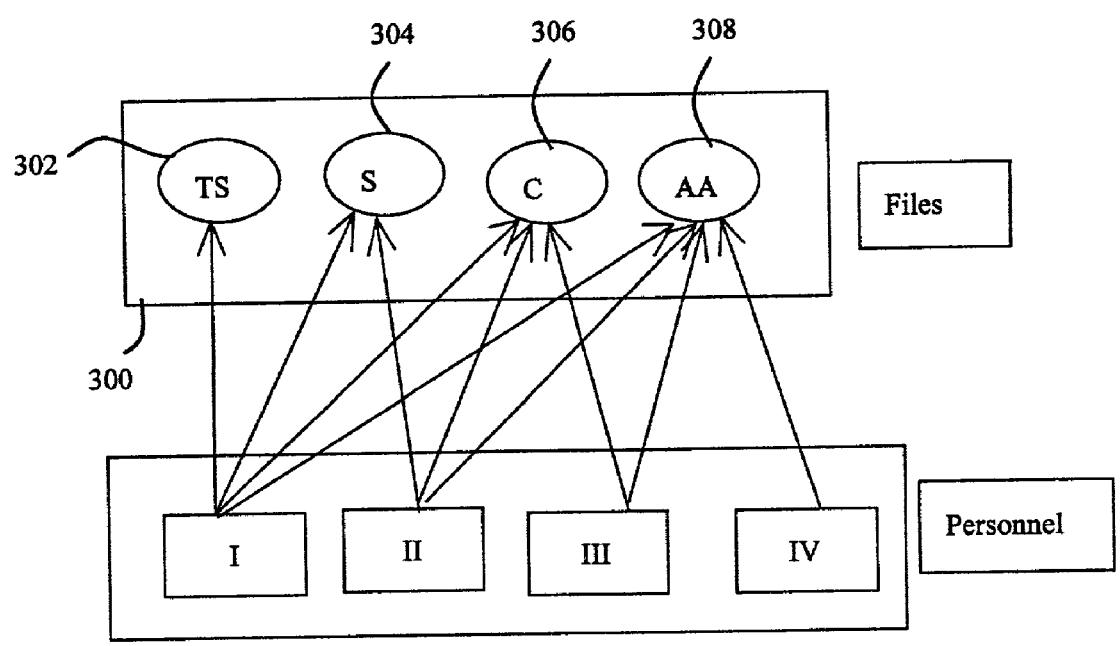
FIG. 3 is a data structure which is useful for describing the operation of an exemplary embodiment of the present invention.

As an example of an application of a the secure architecture according to the present invention, consider a scenario in which there are several sensitive files within the organization that may be accessed by respective personnel depending on their levels of access privileges. (In this example, the files on a file server 300 are described as top secret (TS) files 302, secret (S) files 304, confidential (C) files 306, all general access (AA) files 308; and only some personnel (I) can be given the privilege to access all the files, other personnel (II) could be given the privilege to access the all files except the top secret files, still other personnel (III) could be given access only to the confidential and general access files and a final group (IV) may be allowed access only to the general access files, see FIG. 3):

To make the accesses secure the present invention performs the following operations:

i. The files corresponding to each category of access are stored in encrypted form using a different secret key, one for each category of files.

ii. Two software modules are used—one running on the server and the other running on the user's machine. The server software module is used to process requests submitted by the users to access a particular file and verifies that user has the privilege to access that file. If it determines that the user has the appropriate privileges, it then sends the following $$E_s(k)+E_k(F) \quad (1)$$

Here F is the file, k is the secret key used to encrypt the file, s is a key that we refer as the strong key—it is derived from the user's OTP password, and biometrics features of the user, and + denotes the usual concatenation. The client software module receives message (1) from the server module, and then it decrypts $E_s(k)$ and uses the key k to decrypt $E_k(F)$ and gets the file F. Also, the client module is responsible for sending a file access request to the server software module. (It is possible to make these files readable by using only the client software module—this would impede any copying of the information in the file).

In one exemplary embodiment of the invention, this strong key may be generated using the following steps. First, the requests access to the remote server. This request is received by the computer 202 which forwards it to the computer 204 which, in turn, forwards the request to the server 102. The server determines the identity of the requestor and generates a value $hash^{n-1}(password)$ which is transmitted back to the user through the computers 204 and 202. This value may be encrypted, for example, using a private key before being transmitted to the user. Upon receiving this value, the user enters his or her biometric information and the user's computer applies the hash function to the received value to calculate the one-time password value $hash^n(password)$. The user's computer then concatenates the one-time password value with the biometric data, encrypts the result with the public key corresponding to the private key of the server and transmits the result to the server 102. Once the server has verified the user by 1) decrypting the concatenated password using the server's private key; 2) verifying the one-time password and 3) verifying the biometric, the server may form the value $E_s(k)+E_k(F)$ by 1) encrypting the requested file F using a symmetric key, k; 2) multiplying the key k by the received biometric value and by the received one-time password, 3) concatenating the resulting product to the encrypted file and 4) transmitting the result to the user through a new connection established between the user's computer 100 and the computer 204.

The user, upon receiving the data, separates the value $E_s(k)$, and divides it by the previously stored one-time password and by the previously stored biometric to recover the symmetric key k. This key is then used to decrypt the data $E_k(F)$ in order to recover the file F.

It is contemplated that the present invention may be embodied in computer program instructions that cause a computer to perform the steps of the invention. These computer program instructions may be embodied in a computer-readable carrier such as an integrated circuit, memory card, magnetic or optical disk.

Although the invention has been described in terms of exemplary embodiments, it is contemplated that it may be practiced as outlined above within the scope of the appended claims.

What is claimed:

1. A method for forming a strong password comprising the steps of:

obtaining biometric data from a user;

generating a one-time password for the user; and combining the biometric data and the one-time password to form the strong password.

2. A method according to claim 1, further comprising the step of encrypting the combined one-time password and biometric data using an encryption key to form the strong password.

3. A method for controlling access to secure data comprising the steps of:

receiving a strong password including one-time password and biometric data from a user;

separating the one-time password and the biometric data;

comparing the one-time password to a calculated one-time password to determine if the one-time password is valid;

determining a probability that the biometric data is from the user;

encrypting the secure data using an encryption key to obtain encrypted data if the one-time password matches the calculated one-time password and the probability that the biometric data is from the user exceeds a predetermined threshold value;

combining the strong password, the encryption key and the encrypted data; and transmitting the combined strong password, encryption key and encrypted data to the user.

4. A method according to claim 3, further including the step of encrypting the combined strong password and encryption key using a further encryption key.

5. A method according to claim 3, wherein the secure data includes items having respectively different security levels, and the step of encrypting the secure data aborts the method if either the one-time password does not match the calculated one-time password or the probability that the biometric data is from the user does not exceed the predetermined threshold value.

6. A system for implementing secure access to a remote computer system comprising:

at least one first computer securely coupled to the remote computer system;

at least one second computer coupled to said at least one first computer and configured to obtain identifying Information from a user;

wherein the second computer passes the identifying information to the first computer, the first computer passes the identifying information to the remote computer system and the remote computer system verifies the identifying information.

7. A system according to claim 6, wherein the identifying information is a strong password including a one-time password and biometric information.

8. A system according to claim 7, wherein the identifying information is encrypted with an encryption key.

9. A system according to claim 8, wherein the at least one second computer is securely connected to said at least one first computer by means of a Secure Socket Layer connection.

10. A system according to claim 9, wherein the at least one second computer includes a further Secure Socket Layer connection for receiving the identifying information from the user.

11. A system according to claim 9, wherein the remote computer includes firewall software through which the at least one first computer is coupled to the remote computer.

12. A method of allowing access to secure data on a remote computer, including the steps of:

a) receiving a request from a user to access the secure data at a first computer;

b) transferring the request to access the secure data from the first computer to a second computer;

c) transferring the request to access the secure data from the second computer to the remote computer;

d) authorizing access to the secure data at the remote computer;

e) transferring the secure data to the second computer; and f) transferring the secure data from the second computer to the user without using the first computer.

13. A method according to claim 12, wherein the request to access the secure data includes a strong password and step e) includes the steps of:

encrypting the secure data with an encryption key;

combining the encryption key with the strong password;

encrypting the combined encryption key and strong password with a further encryption key; and transferring the encrypted combined encryption key and strong password and the encrypted secure data to the second computer.

14. A method according to claim 13 wherein the step of encrypting the data with an encryption key includes encrypting the data with a symmetric encryption key and the step of encrypting the combined encryption key and strong password with a further encryption key includes the step of encrypting the combined encryption key and strong password with an asymmetric encryption key.

15. A method according to claim 14, wherein the strong password includes a one-time password and biometric information and the step d) Includes the steps of:

separating the one-time password and the biometric information;

comparing the one-time password to a calculated one-time password;

determining a probability that the biometric Information matches an authorized user; and authorizing access to the secure data only if the one time password matches the calculated one-time password and the probability that the biometric information matches an authorized user exceeds a predetermined threshold value.

16. A computer readable carrier including computer program instructions that cause a computer to form a strong password comprising the steps of:

obtaining biometric data from a user;

generating a one-time password for the user; and combining the biometric data and the one-time password to form the strong password.

17. A computer readable carrier according to claim 16, wherein the computer program instructions further cause the computer to perform the step of encrypting the combined one-time password and biometric data using an encryption key to form the strong password.

18. A computer readable carrier including computer program instructions that cause a computer to implement a method for controlling access to secure data comprising the steps of:

receiving a strong password including one-time password and biometric data from a user;

separating the one-time password and the biometric data;

comparing the one-time password to a calculated one-time password to determine if the one-time password is valid;

determining a probability that the biometric data is from the user;

encrypting the secure data using an encryption key to obtain encrypted data if the one-time password matches the calculated one-time password and the probability that the biometric data is from the user exceeds a predetermined threshold value;

combining the strong password, the encryption key and the encrypted data; and transmitting the combined strong password, encryption key and encrypted data to the user.

19. A computer readable carrier according to claim 18, wherein the computer program instructions further cause the computer to perform the step of encrypting the combined strong password and encryption key using a further encryption key.

20. A computer readable carrier according to claim 19, wherein the secure data includes items having respectively different security levels, and the computer program instructions further cause the computer to perform the step of aborting the method if either the one-time password does not match the calculated one-time password or the probability that the biometric data is from the user does not exceed the predetermined threshold value.

21. A method according to claim 1, wherein the step of combining the biometric data and the one-time password includes:
concatenating the biometric data with the one-time password to form the strong password.

22. A method according to claim 1, wherein the step of combining the biometric data and the one-time password includes:
combining the biometric data with the one-time password using one or more arithmetic operations with a result used as the strong password.

* * * * *